(12) United States Patent
Ikeya

(10) Patent No.: US 9,016,413 B2
(45) Date of Patent: Apr. 28, 2015

(54) FUEL CELL VEHICLE

(75) Inventor: Kengo Ikeya, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 14/008,959

(22) PCT Filed: Apr. 16, 2012

(86) PCT No.: PCT/JP2012/060225
§ 371 (c)(1),
(2), (4) Date: Sep. 30, 2013

(87) PCT Pub. No.: WO2012/144445
PCT Pub. Date: Oct. 26, 2012

(65) Prior Publication Data
US 2014/0020968 A1    Jan. 23, 2014

(30) Foreign Application Priority Data

Apr. 18, 2011    (JP) ................. 2011-091873

(51) Int. Cl.
*B60H 1/14*    (2006.01)
*B60L 11/18*    (2006.01)
(Continued)

(52) U.S. Cl.
CPC ............ *B60L 11/1881* (2013.01); *B60H 1/143* (2013.01); *B60K 1/04* (2013.01);
(Continued)

(58) Field of Classification Search
CPC .. B60H 1/22; B60H 1/00021; B60H 1/00028; B60H 1/00564; B60H 1/00385; B60H 1/00392; B60H 1/143; B60L 11/1881; B60L 11/1892; B60L 11/1898; B60K 11/06; H01M 8/00; H01M 8/04014; Y02E 60/50; Y02T 90/32; Y02T 90/34

USPC .................. 180/68.2, 65.31; 237/43; 219/202
See application file for complete search history.

(56) References Cited

U.S. PATENT DOCUMENTS 2,225,244 A * 12/1940 Anderson ........................ 237/69
2,417,463 A *  3/1947 Anderson ........................ 237/43
(Continued)

FOREIGN PATENT DOCUMENTS

DE          864 666 B     1/1953
DE       198 47 605 A1    4/2000
(Continued)

OTHER PUBLICATIONS

International Search Report and Written Opinion of the International Searching Authority dated Jul. 5, 2012 for corresponding Application No. PCT/JP2012/060225.
(Continued)

*Primary Examiner* — J. Allen Shriver, II
*Assistant Examiner* — Steve Clemmons
(74) *Attorney, Agent, or Firm* — Alston & Bird LLP

(57) ABSTRACT

An object of the present invention is to efficiently heat a vehicle cabin of a fuel cell vehicle by utilizing heat of air discharged from a fuel cell stack. In a fuel cell vehicle in which an exhaust duct configured to discharge air from a fuel cell stack is arranged below a floor, the exhaust duct includes: a lower surface wall facing at least a lower surface of the floor with a predetermined gap therebetween; and a pair of side walls extending from right and left side portions of the lower surface wall toward the lower surface of the floor, and the floor is configured to be heated by the air flowing in the exhaust duct.

1 Claim, 3 Drawing Sheets

(51) Int. Cl.
    *B60K 1/04*         (2006.01)
    *B60K 11/08*      (2006.01)
    *B60H 1/00*       (2006.01)
    *B60H 1/24*       (2006.01)
    *H01M 8/04*      (2006.01)
    *B60K 11/06*      (2006.01)

(52) U.S. Cl.
    CPC ........ B60K 11/08 (2013.01); B60K 2001/0411 (2013.01); B60H 1/00385 (2013.01); B60H 1/246 (2013.01); H01M 8/04014 (2013.01); *H01M 2250/20* (2013.01); *Y02E 60/50* (2013.01); *Y02T 90/32* (2013.01); B60L 11/1892 (2013.01); *Y02T 90/34* (2013.01); B60K 11/06 (2013.01)

(56) References Cited

U.S. PATENT DOCUMENTS

| | | | | |
|---|---|---|---|---|
| 2,587,871 | A * | 3/1952 | May et al. | 237/43 |
| 2,595,613 | A * | 5/1952 | Spencer et al. | 454/105 |
| 2,668,666 | A * | 2/1954 | Anderson | 237/43 |
| 2,703,680 | A * | 3/1955 | Nallinger | 237/8 A |
| 6,978,855 | B2 * | 12/2005 | Kubota et al. | 429/442 |
| 8,268,470 | B2 | 9/2012 | Matsumoto et al. | 429/71 |
| 2004/0195345 | A1 * | 10/2004 | Eberspach et al. | 237/32 |
| 2009/0032318 | A1 | 2/2009 | Ishitoya | |
| 2009/0133943 | A1 | 5/2009 | Noguchi et al. | |
| 2009/0139973 | A1 * | 6/2009 | Hung | 219/202 |
| 2009/0317692 | A1 * | 12/2009 | Matsumoto et al. | 429/34 |
| 2010/0274396 | A1 * | 10/2010 | Yang et al. | 700/278 |
| 2011/0105003 | A1 * | 5/2011 | Park et al. | 454/75 |

FOREIGN PATENT DOCUMENTS

| | | |
|---|---|---|
| DE | 10 2006 052 601 A1 | 5/2008 |
| DE | 11 2006 002 968 T5 | 10/2008 |
| JP | 62-27814 U | 2/1987 |
| JP | 02258409 A * | 10/1990 |
| JP | 3-251639 A | 11/1991 |
| JP | 8-253019 A | 10/1996 |
| JP | 9-66724 A | 3/1997 |
| JP | 2003-118396 A | 4/2003 |
| JP | 2005-280639 A | 10/2005 |
| JP | 2005280639 A * | 10/2005 |
| JP | 2006-103023 A | 4/2006 |
| JP | 2006-347486 A | 12/2006 |
| JP | 2008-108538 A | 5/2008 |
| JP | 2008108538 A * | 5/2008 |
| JP | 2008-174085 | 7/2008 |
| WO | WO 2005063570 A1 * | 7/2005 |

OTHER PUBLICATIONS

Office Action for German Application No. 11 2012 001 741.2 dated Dec. 17, 2014.

* cited by examiner

FUEL CELL VEHICLE

CROSS-REFERENCE TO RELATED APPLICATIONS

This application is a national stage application filed under 35 U.S.C. 371 of International Application No. PCT/JP2012/060225, filed Apr. 16, 2012, which claims priority from Japanese Patent Application No. 2011-091873, filed Apr. 18, 2011, each of which is incorporated by reference herein in its entirety.

TECHNICAL FIELD

The present invention relates to a fuel cell vehicle, and in particular, relates to a fuel cell vehicle which performs heating by utilizing heat of air discharged from a fuel cell stack.

BACKGROUND ART

A water-cooled fuel cell system and an air-cooled fuel cell system are known as fuel cell systems mounted on fuel cell vehicles. In the water-cooled fuel cell system, heat generated by a fuel cell stack is cooled by cooling water. On the other hand, in the air-cooled fuel cell system, a fuel cell stack is cooled by cooling air supplied by a blower fan for cooling.

First, FIG. 4 shows the configuration of a general water-cooled fuel cell system of a conventional fuel cell vehicle. As shown in FIG. 4, in a water-cooled fuel cell system 101, a high-pressure compressed hydrogen gas stored in a hydrogen tank 102 is introduced into an anode intake portion 106 of a fuel cell stack 105 via a decompression valve 104 by using a hydrogen supply pipe 103.

Moreover, in the fuel cell system 101, the outside air sucked into an intake duct 107 is cleaned by a filter 108, thereafter compressed by a compressor 109, and then introduced into a cathode intake portion 110 of the fuel cell stack 105. As a result, in the fuel cell stack 105, electric power is generated by electrochemical reaction between hydrogen and oxygen in the air.

Excess air is discharged from a cathode exhaust portion 111 of the fuel cell stack 105 to an exhaust duct 112 as cathode exhaust. After part of moisture in the cathode exhaust is separated by a steam separator 113, the cathode exhaust is introduced into an exhaust duct 112 through a back pressure valve 114 intended to control the pressure of a code system and is released to the outside of the vehicle.

Moreover, an excess hydrogen gas is discharged from an anode exhaust portion 115 of the fuel cell stack 105 as anode exhaust. The anode exhaust also passes through a steam separator 116 like the cathode exhaust, is introduced into the exhaust duct 112 through a purge valve 117, and is mixed with the cathode exhaust. The flow amount of the anode exhaust is far smaller than that of the cathode exhaust. Accordingly, purged hydrogen in the anode exhaust can be diluted with the cathode exhaust to a concentration not higher than 4% which is the lower flammability limit, and then released to the outside of the vehicle. Depending on the type of the fuel cell system 101, the anode exhaust is recirculated to the anode intake portion 106 by using a hydrogen pump 118 to improve the utilization ratio of hydrogen.

The water-cooled fuel cell system 101 includes a cooling system 118. The cooling system 118 includes a loop-shaped cooling water passage 120 connecting the fuel cell stack 105 and a radiator 119 to each other, and circulates the cooling water between the radiator 119 and the fuel cell stack 105 with a water pump 121 to cool the fuel cell stack 105. The fuel cell system 101 utilizes high-temperature cooling water flowing through the cooling water passage 120 in a heating device 122. The heating device 122 supplies the cooling water to a heater core 124 by using an adjusting valve 123, drives a fan 125 for sending air, and thereby heats a vehicle cabin 3.

Next, the configuration of the air-cooled fuel cell system of a fuel cell vehicle is described by using FIG. 5. As shown in FIG. 5, also in an air-cooled fuel cell system 201, a compressed hydrogen gas stored in a hydrogen tank 202 is sent to a decompression valve 204 by using a hydrogen supply pipe 203 to be decompressed, and thereafter introduced into an anode intake portion 206 of a fuel cell stack 205.

On the other hand, a supply device of cathode intake has no high-pressure compressor. The supply device cleans air sucked into an intake duct 207 by using a filter 208 and then supplies the air to a cathode intake portion 210 of the fuel cell stack 205 by using a low-pressure blower fan 209. Air supplied to the cathode intake portion 210 not only is used for electric power generation reaction in the fuel cell stack 205 but also has a role of removing heat generated in the fuel cell stack 205 and cooling the fuel cell stack 205.

Cathode exhaust which is excess air discharged from a cathode exhaust portion 211 of the fuel cell stack 205 is released to the outside of the vehicle by using an exhaust duct 212. Moreover, anode exhaust which is an excess hydrogen gas discharged from an anode exhaust portion 213 of the fuel cell stack 205 passes through a purge valve 214 and is mixed with the cathode exhaust flowing through the exhaust duct 212. A purged hydrogen gas from the anode exhaust portion 213 is diluted with the cathode exhaust to a concentration not higher than the lower flammability limit, and then released to the outside of the vehicle.

Conventional heating devices of vehicles equipped with fuel cell stacks include the following heating devices. In one heating device (Japanese Patent Laid-Open No. 2008-108538), air discharged from a fuel cell stack is directly introduced into a vehicle cabin. In another heating device (Japanese Patent Laid-Open No. 2005-280639), a heat exchanger through which cooling water heated by heat generated in a fuel cell stack flows is disposed on a lower surface of a floor and an inside of a vehicle cabin is heated by utilizing the heat of the cooling water.

CITATION LIST

Patent Literatures

[PTL 1]
Japanese Patent Laid-Open No. 2008-108538
[PTL 2]
Japanese Patent Laid-Open No. 2005-280639

SUMMARY OF INVENTION

Technical Problems

Generally, in the vehicle equipped with the water-cooled fuel cell system 101 shown in FIG. 4, the cooling water whose temperature has increased after cooling the fuel cell stack 105 is introduced into the heater core 124 of the heating device 122 and the heat of the cooling water is utilized to heat the inside of the vehicle cabin.

However, since the fuel cell system 101 has an operating temperature lower than that of an internal combustion engine and is highly efficient, the temperature of the cooling water of the fuel cell stack 105 is lower than the temperature of the cooling water of the internal combustion engine. Accordingly, the performance of heating the inside of the vehicle cabin is insufficient in many cases when heating is performed by using only the cooling water of the fuel cell stack 105, and an auxiliary heater such as a PTC heater is used in such cases.

Although an electric heater such as a PTC heater can be used as the heating device, the amount of electric power consumption increases when the heating device operates and this causes reduction in fuel efficiency. Accordingly, an auxiliary heating device which consumes no electric power is required.

Moreover, unlike the water-cooled fuel cell system 101 shown in FIG. 4, the air-cooled fuel cell system 201 shown in FIG. 5 has no cooling system 118 for circulating the cooling water. Accordingly, a heating device which can efficiently heat the vehicle cabin without using the cooling water is required.

Furthermore, in the heating device described in Patent Literature 1, it is difficult to heat the entire vehicle cabin due to the amount of heat. On the other hand, the heating device described in Patent Literature 2 has a problem that the structure is complex and the amount of electric power consumption increases.

An object of the present invention is to efficiently heat a vehicle cabin of a fuel cell vehicle by utilizing heat of air discharged from a fuel cell stack.

Solution to Problems

The present invention is a fuel cell vehicle including an exhaust duct disposed below a floor of the vehicle, the exhaust duct configured to discharge air from a fuel cell stack, wherein the exhaust duct includes: a lower surface wall facing at least a lower surface of the floor with a predetermined gap between the lower surface wall and the lower surface of the floor; and a pair of side walls extending from right and left side portions of the lower surface wall toward the lower surface of the floor, and the floor is configured to be heated by the air flowing in the exhaust duct.

Advantageous Effects of Invention

In the fuel cell vehicle of the present invention, the floor is heated by the heat of the air discharged from the fuel cell stack and flowing through the exhaust duct and the vehicle cabin of the fuel cell vehicle can be thereby efficiently heated.

Moreover, since the fuel cell vehicle of the present invention uses a method in which the floor is heated by the heat of the air discharged from the fuel cell stack and flowing in the exhaust duct, the heating can be started immediately after the start of the operation of the fuel cell stack. Furthermore, compared to a method of heating the floor by circulating cooling water, it is possible to make a passage structure for fluid simpler and to reduce the amount of electric power consumption.

DESCRIPTION OF EMBODIMENTS

An embodiment of the present invention is described below based on the drawings.

Figure 1:
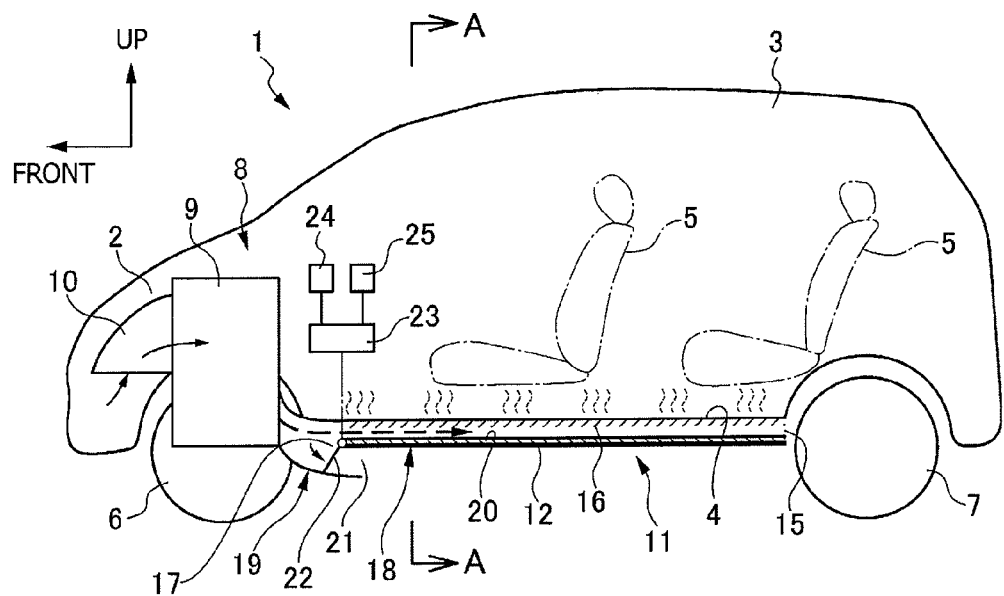
FIG. 1 is a side cross-sectional view of a fuel cell vehicle in a state where floor heating is performed.
Figure 2:
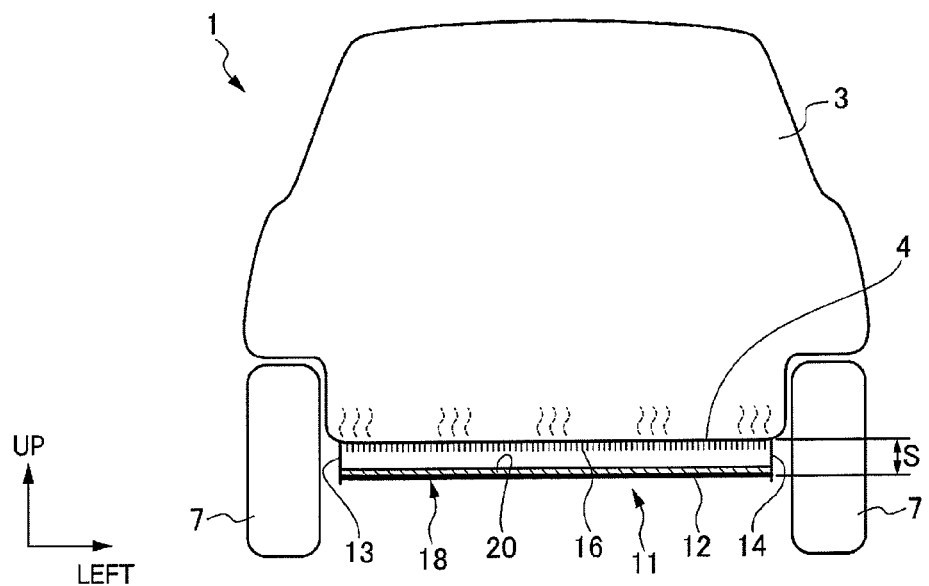
FIG. 2 is a cross-sectional view taken along the A-A line of FIG. 1.
Figure 3:
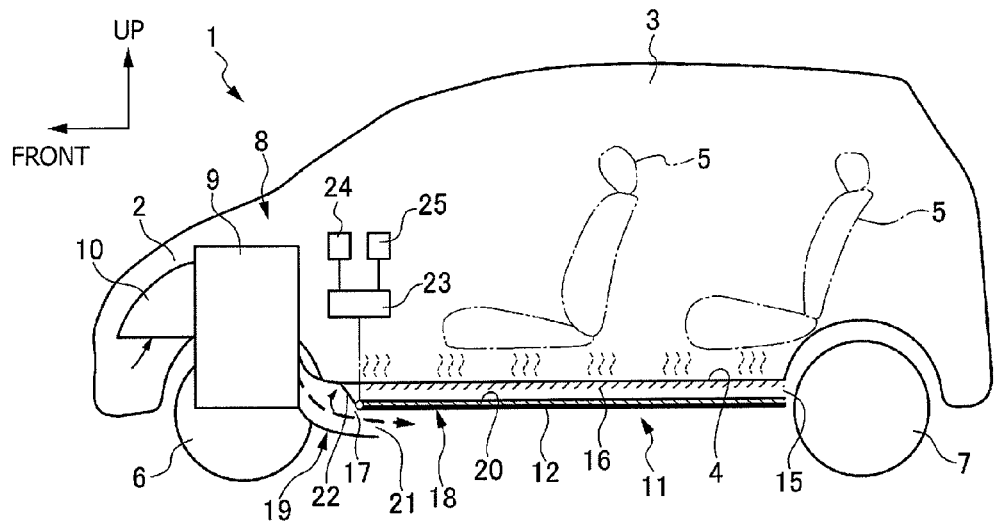
FIG. 3 is a side cross-sectional view of the fuel cell vehicle in a state where floor heating is not performed.
Figure 4:
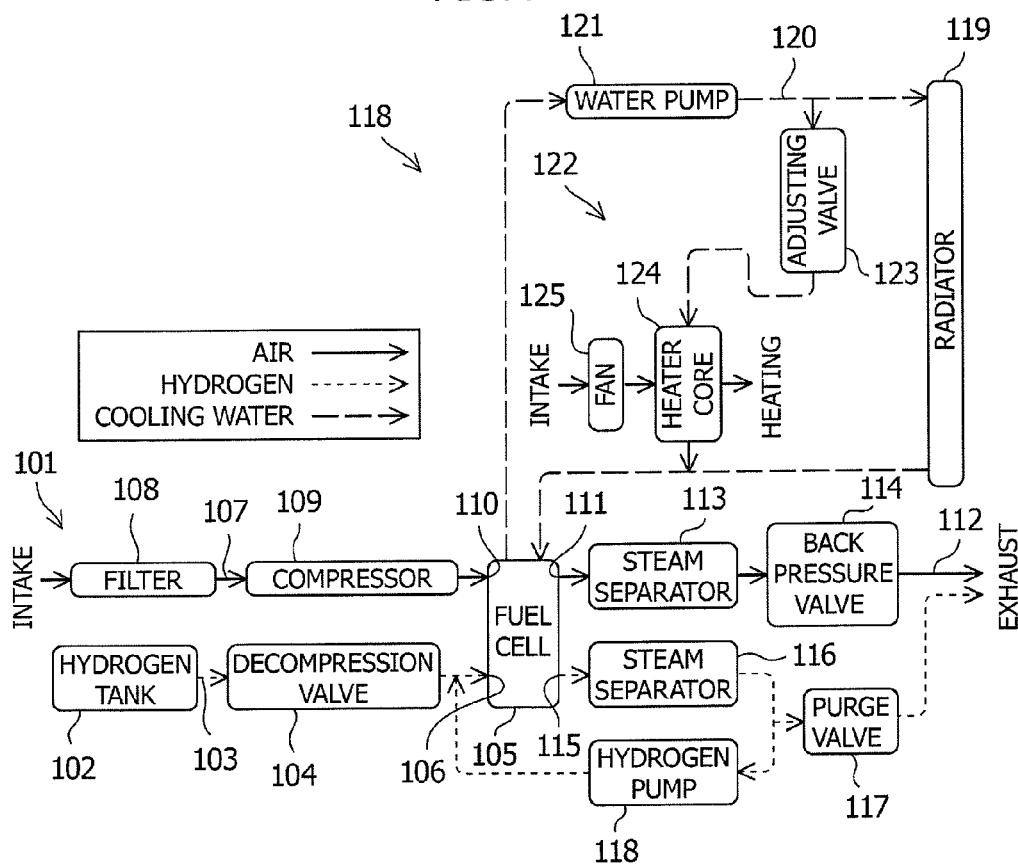
FIG. 4 is a block diagram of a water-cooled fuel cell system
Figure 5:
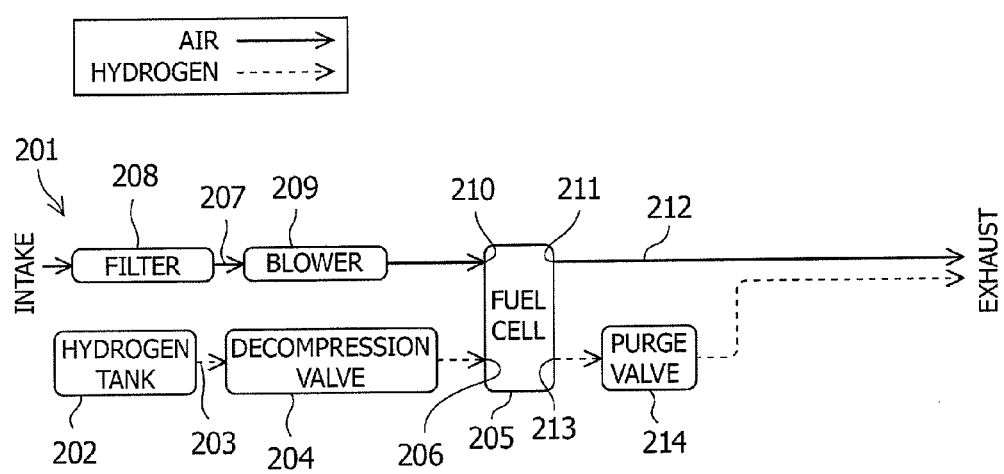
FIG. 5 is a block diagram of an air-cooled fuel cell system.

FIGS. 1 to 3 illustrate the embodiment of the present invention. In FIG. 1, reference numeral 1 denotes a fuel cell vehicle, reference numeral 2 denotes a front room, reference numeral 3 denotes a vehicle cabin, reference numeral 4 denotes a floor, reference numeral 5 denotes a seat, reference numeral 6 denotes a front wheel, and reference numeral 7 denotes a rear wheel. The fuel cell vehicle 1 is a four-wheel vehicle and a fuel cell stack 9 of a fuel cell system 8 is mounted in the front room 2 in a front portion of the vehicle. Seats 5 are disposed on the floor 4 of the vehicle cabin 3 behind the front room 2. The fuel cell stack 9 includes an intake duct 10 configured to suck in the outside air in a front portion and includes an exhaust duct 11 configured to discharge air in a rear portion.

The fuel cell stack 9 generates electric power by means of electrochemical reaction between hydrogen supplied from a hydrogen tank and oxygen in the air sucked in from the intake duct 10. The air supplied to the fuel cell stack 9 not only is used as a reaction gas with hydrogen in electric power generation reaction, but also has a role of a cooling medium which removes reaction heat in the fuel cell stack 9 and cools the fuel cell stack 9. Accordingly, the fuel cell stack 9 has such a structure as to be cooled by air, and is an air-cooled fuel cell stack which uses air as the reaction gas and as the cooling medium. Hence, the fuel cell system 8 is an air-cooled fuel cell system.

Excess air left after the reaction with hydrogen and air having cooled the fuel cell stack 9 are released together with an excess hydrogen gas not used for electric power generation from the fuel cell stack 9 to the outside of the vehicle by using the exhaust duct 11.

As shown in FIG. 2, the exhaust duct 11 includes: a lower surface wall 12 facing at least a lower surface of the floor 4 with a predetermined gap S provided therebetween; and a pair of right and left side walls 13, 14 extending toward a lower surface of the floor 4 from both side portions of the lower surface wall 12 in a vehicle right-left direction, and is formed in a gutter shape in which the exhaust duct 11 is open on an upper side. The exhaust duct 11 covers the entire lower surface of the floor 4 of the vehicle cabin 3 arranged between the set of front wheels 6 and the set of rear wheels 7 and forms an exhaust passage extending along the floor 4. Moreover, the exhaust duct 11 includes a discharge port 15 configured to discharge air to the outside, immediately in front of the rear wheels 7.

A heat sink 16 configured to exchange heat with the air in the exhaust duct 11 is provided on a lower surface of the floor 4. In the fuel cell vehicle 1, the floor 4 is heated by the heat of the air discharged from the fuel cell stack 9 and flowing in the exhaust duct 11.

As described above, the fuel cell vehicle 1 can perform underfloor heating by heating the entire floor 4 of the fuel cell vehicle 1 by the heat of the air discharged from the fuel cell stack 9 and flowing in the exhaust duct 11, and thereby efficiently heat the vehicle cabin 3. Moreover, since the fuel cell vehicle 1 uses a method in which the floor 4 is heated by the heat of the air discharged from the fuel cell stack 9 and flowing in the exhaust duct 11, the heating can be started immediately after the start of the operation of the fuel cell stack 9. Furthermore, compared to a method of heating the floor by circulating cooling water, it is possible to make the passage structure for fluid simpler and to reduce the amount of electric power consumption.

Moreover, in the structure in which the fuel cell stack 9 mounted on the fuel cell vehicle 1 is cooled by air, a large amount of air heated by the fuel cell stack 9 flows through the exhaust duct 11. Accordingly, the heating effect of the floor 4 is improved.

Furthermore, in the fuel cell vehicle 1, since the exhaust duct 11 has the gutter shape in which the exhaust duct 11 is open on the upper side, the structure of the exhaust duct 11 can be simplified. In addition, the heat of the air can be directly transferred to the floor 4 and the heating effect of the floor 4 is thereby improved.

Moreover, in the fuel cell vehicle 1, the heat of the air flowing in the exhaust duct 11 can be efficiently transferred to the floor 4 by the heat sink 16 provided on the lower surface of the floor 4 and the heating effect of the floor 4 is thereby improved.

As shown in FIGS. 1 and 3, the exhaust duct 11 branches, at a branching portion 17 immediately behind the front wheels 6, into a first exhaust duct 18 extending along the lower surface of the floor 4 and a second exhaust duct 19 extending away from the floor 4. The first exhaust duct 18 has a heat insulating layer 20 on the lower surface wall 12. The second exhaust duct 19 includes a discharge port 21 configured to discharge air to the outside, below the first exhaust duct 18 and slightly behind the branching point 17. The passage length of the second exhaust duct 19 is shorter than the passage length of the first exhaust duct 18.

A switching valve 22 configured to switch a flow direction of air to the first exhaust duct 18 side or to the second exhaust duct 19 side is disposed in the branching portion 17. In the fuel cell vehicle 1, the temperature of the floor 4 is adjusted by adjusting the amount of air flowing into the first exhaust duct 18 and the amount of air flowing into the second exhaust duct 19 with the switching valve 22.

As described above, in the fuel cell vehicle 1, when no underfloor heating is required, the switching valve 22 configured to switch the flow direction of air to the first exhaust duct 18 side or to the second exhaust duct 19 side causes the air discharged from the fuel cell stack 9 to flow to the second exhaust duct 19 side as shown in FIG. 3 and the heating of the floor 4 can be thereby stopped. Hence, the switching valve 22 can contribute to improvement in efficiency of waste heat utilization in heating and to thermal isolation between the vehicle cabin 3 and the air in the case in which heating is not performed.

Moreover, in the fuel cell vehicle 1, when air is discharged from the discharge port 21 of the second exhaust duct 19 which has a shorter passage length than the first exhaust duct 18, the heat insulating layer 20 provided on the lower surface wall 12 of the first exhaust duct 18 prevents the heat of air from heating the lower surface wall 12 of the first exhaust duct 18, and the increase of the temperature of the floor 4 due to heat transfer can be thereby prevented.

Furthermore, in the fuel cell vehicle 1, the second exhaust duct 19 has a passage length shorter than the first exhaust duct 18. Accordingly, when the air is discharged to the outside of the vehicle from the discharge port 21 of the second exhaust duct 19, the air flow resistance of the second exhaust duct 19 is reduced and discharge of air from the fuel cell stack 9 to the outside can be facilitated.

Moreover, in the fuel cell vehicle 1, the temperature of the floor 4 is adjusted by adjusting the amounts of air flowing to the first exhaust duct 18 and the second exhaust duct 19 with the switching valve 22. Accordingly, the temperature of the floor 4 can be adjusted in a simple structure.

In the fuel cell vehicle 1, a control unit 23 performs switching control of the switching valve 22. An outside air temperature sensor 24 configured to detect the outside air temperature is connected to the control unit 23. The control unit 23 controls the switching valve 22 on the basis of detection signals from the outside air temperature sensor 24 in such a way that the air is distributed to the upper exhaust duct 18 and the lower exhaust duct 19 in accordance with the outside air temperature.

When the outside air temperature is lower than a certain set temperature T1, the control unit 23 controls the switching valve 22 in such a way that the air discharged by the fuel cell stack 9 is guided to the first exhaust duct 18, so that the underfloor heating of the vehicle cabin 3 can be performed. When the outside air temperature exceeds another set temperature T2 which is set to be higher than the set temperature T1, the control unit 23 controls the switching valve 22 in such a way that the air discharged by the fuel cell stack 9 is guided to the second exhaust duct 19 (T1<T2).

As described above, the fuel cell vehicle 1 can perform underfloor heating control in accordance with the outside air temperature by controlling the switching valve 22 in accordance with the outside air temperature and variably controlling a distribution ratio of air flowing to the first exhaust duct 18 and the second exhaust duct 19. The fuel cell vehicle 1 can thereby heat the floor 4 by the heat of the air discharged from the fuel cell stack 9 and increase the temperature of a portion under the feet to a comfortable temperature in the case of low outside air temperature, even if an occupant performs no operation of the heating device.

Moreover, a switching condition of the switching valve 22 may be the vehicle cabin temperature instead of the outside air temperature. In this case, a vehicle cabin temperature sensor 25 configured to detect the vehicle cabin temperature is connected to the control unit 23. The control unit 23 controls the switching valve 22 in accordance with the vehicle cabin temperature on the basis of the detection signal from the vehicle cabin temperature sensor 25. This makes it is possible to heat the floor 4 and to increase the temperature of a portion under the feet to a comfortable temperature in the case of low vehicle cabin temperature, even if an occupant performs no operation of the heating device.

The switching valve 22 can variably control the distribution ratio of air flowing to the first exhaust duct 18 and the second exhaust duct 19 in accordance with not only the outside air temperature and the vehicle cabin temperature but also an operation state of the heating device mounted on the fuel cell vehicle 1. When the heating device is operating, the switching valve 22 is controlled in such a way that air discharged by the fuel cell stack 9 is guided to the first exhaust duct 18, so that the underfloor heating can be performed by heating the floor 4 of the vehicle cabin 3. When the heating device is not operating, the switching valve 22 is controlled in such a way that air discharged by the fuel cell stack 9 is guided to the second exhaust duct 19.

Accordingly, the fuel cell vehicle 1 can variably control a distribution ratio of air flowing to the first exhaust duct 18 and the second exhaust duct 19 in accordance with a set heating temperature of the heating device and an air flow amount, and thereby perform underfloor heating control in accordance with heating request.

In the embodiment described above, the fuel cell stack 9 is mounted in the front room 2 in the front portion. However, the mounting position of the fuel cell stack 9 is not limited to this and the fuel cell stack 9 may be mounted under the floor 4. In this case, the effect of underfloor heating can be similarly obtained by forming an appropriate duct structure.

INDUSTRIAL APPLICABILITY

The fuel cell vehicle of the present invention performs underfloor heating of the fuel cell vehicle by effectively utilizing the heat of the air discharged from the fuel cell stack. However, the present invention can be applied to not only the fuel cell vehicle but also indoor heating using a fuel cell stack of an air-cooled stationary fuel cell system for a house.

REFERENCE SIGNS LIST

1 Fuel cell vehicle
2 Front room
3 Vehicle cabin
4 Floor
8 Fuel cell system
9 Fuel cell stack
10 Intake duct
11 Exhaust duct
12 Lower surface wall
13 Right side wall
14 Left side wall
15 Discharge port
16 Heat sink
17 Branching portion
18 First exhaust duct
19 Second exhaust duct
20 Heat insulating layer
21 Discharge port
22 Switching valve
23 Control unit
24 Outside air temperature sensor
25 Vehicle cabin temperature sensor

The invention claimed is:

1. A fuel cell vehicle having an exhaust duct below a floor, the exhaust duct configured to discharge air from a fuel cell stack, wherein the exhaust duct comprises: a lower surface wall facing at least a lower surface of the floor with a predetermined gap between the lower surface wall and the lower surface of the floor; and a pair of side walls extending from right and left side portions of the lower surface wall toward the lower surface of the floor, so that the floor is configured to be heated by the air flowing in the exhaust duct wherein the exhaust duct branches at a branching portion into a first exhaust duct extending along the lower surface of the floor and a second exhaust duct extending away from the floor, and a switching valve configured to switch a flow direction of air to the first exhaust duct side or to the second exhaust duct side is disposed in the branching portion, and wherein the second exhaust duct includes, below the first exhaust duct, a discharge port configured to discharge air to the outside, and the first exhaust duct has a heat insulating layer on the lower surface wall.

* * * * *